(12) United States Patent
Brown et al.

(10) Patent No.: US 8,056,327 B2
(45) Date of Patent: Nov. 15, 2011

(54) MICRO-VENTURI EXHAUST COOLING DEVICE

(75) Inventors: Andrea C. Brown, Fort Wayne, IN (US); Jeffrey R. Kelso, Fort Wayne, IN (US); Michael J. Eifert, Fort Wayne, IN (US); Timothy Juan, Fort Wayne, IN (US); Mark A. Schmale, Fort Wayne, IN (US); Daniel C. Dew, Fort Wayne, IN (US); Roger W. Byers, Fort Wayne, IN (US); Ronald E. Schoon, Fort Wayne, IN (US); Brent Koontz, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 1038 days.

(21) Appl. No.: 11/614,124

(22) Filed: Dec. 21, 2006

(65) Prior Publication Data
US 2007/0245725 A1 Oct. 25, 2007

Related U.S. Application Data

(60) Provisional application No. 60/794,633, filed on Apr. 25, 2006.

(51) Int. Cl.
*F01N 3/00* (2006.01)
*F01N 3/02* (2006.01)
*F01N 5/04* (2006.01)
*F01N 1/14* (2006.01)
*F01N 13/00* (2010.01)
*F02B 35/00* (2006.01)

(52) U.S. Cl. ............... 60/298; 60/316; 60/319; 181/259; 181/262; 181/239

(58) Field of Classification Search .................... 60/316, 60/319, 317; 181/259, 262, 239
See application file for complete search history.

(56) References Cited

U.S. PATENT DOCUMENTS

| | | | |
|---|---|---|---|
| 1,783,674 A * | 12/1930 | Rehwold et al. | 417/159 |
| 2,211,795 A | 8/1940 | Sauer | |
| 2,293,632 A | 8/1942 | Sauer | |
| 3,186,511 A | 6/1965 | Kliewer, Sr | |
| 3,657,878 A * | 4/1972 | Kaufmann, Jr. | 60/308 |
| 4,227,651 A * | 10/1980 | Abe | 239/428 |

(Continued)

OTHER PUBLICATIONS

International Preliminary Report on Patentability for corresponding PCT application number, PCT/US2007/061812, mail date Mar. 4, 2010.

*Primary Examiner* — Thomas Denion
*Assistant Examiner* — Michael Carton
(74) *Attorney, Agent, or Firm* — Jeffrey P. Calfa; Mark C. Bach; Gerald W. Askew

(57) ABSTRACT

An exhaust gas-cooling device for use on an exhaust gas conveyance system of a vehicle having an exhaust gas passageway to emit exhaust gases from an engine to an outlet includes an exhaust passageway pipe in fluid communication with the engine, and a micro-venturi mixing chamber pipe in fluid communication with and located downstream of the exhaust passageway pipe. The micro-venturi mixing chamber pipe defines the outlet of the exhaust gas-cooling device and has at least one aperture disposed on a pipe body of the micro-venturi mixing chamber for introducing ambient air into the micro-venturi mixing chamber pipe.

6 Claims, 6 Drawing Sheets

U.S. PATENT DOCUMENTS

| | | |
|---|---|---|
| 4,265,332 A | 5/1981 | Presnall et al. |
| 4,388,804 A * | 6/1983 | Bushmeyer .................... 60/319 |
| 5,454,139 A | 10/1995 | Beck |
| 6,832,665 B2 | 12/2004 | Crombeen |
| 7,703,573 B2 * | 4/2010 | Feight et al. .................. 181/239 |
| 2005/0205355 A1 | 9/2005 | Lin |

* cited by examiner

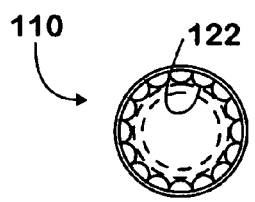
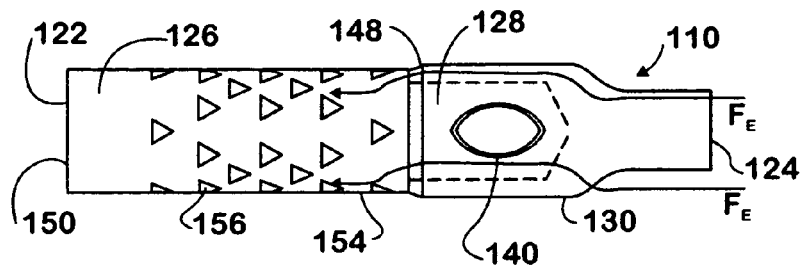
FIG. 6A
FIG. 6B
FIG. 6C
FIG. 6D

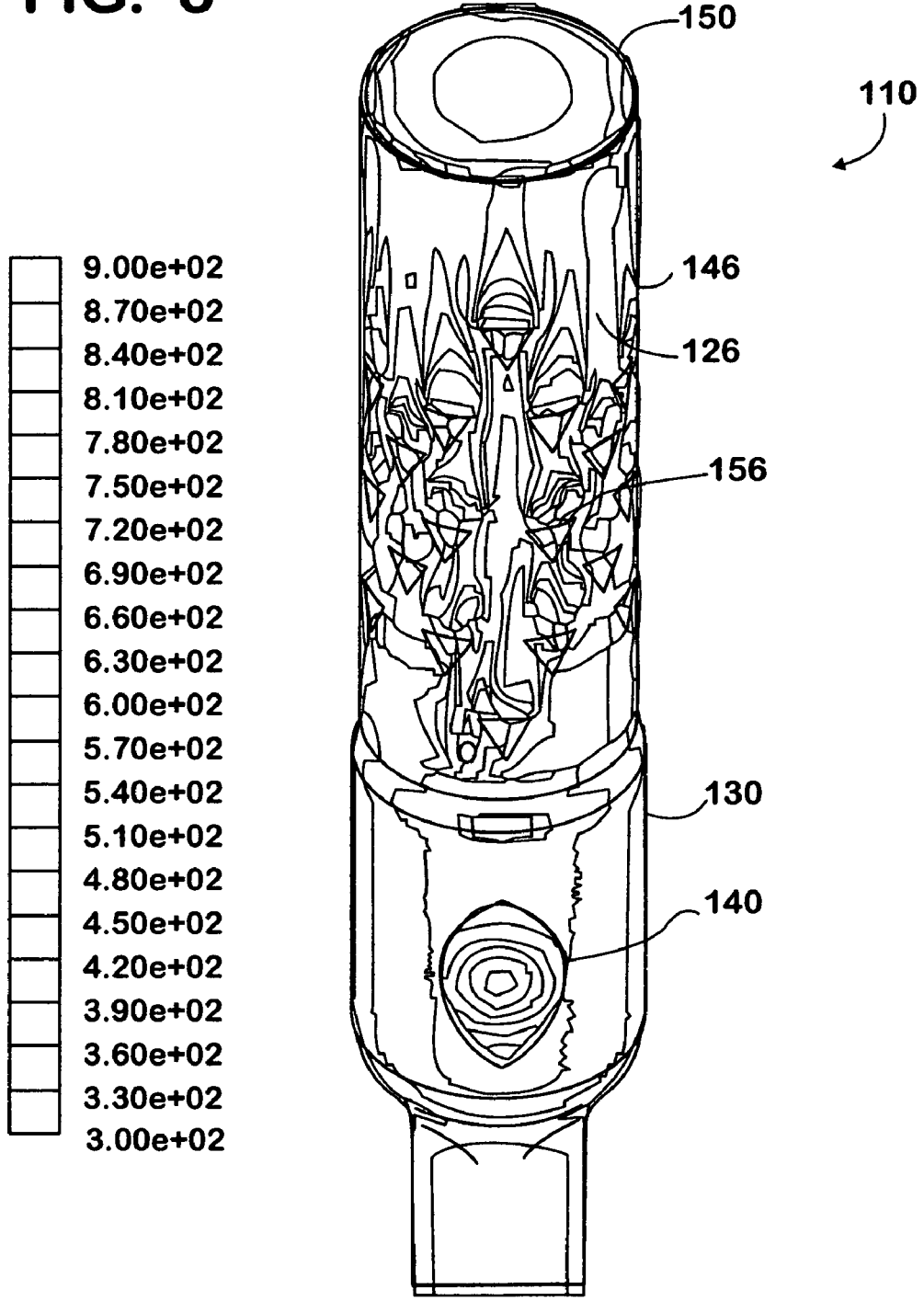

MICRO-VENTURI EXHAUST COOLING DEVICE

STATEMENT OF RELATED CASE

The present application claims priority under 35 USC§120 from U.S. Ser. No. 60/794,633 filed Apr. 25, 2006, which is herein incorporated by reference.

BACKGROUND OF THE INVENTION

The present invention relates generally to exhaust gas conveyance systems in vehicles. More specifically, the present invention relates to an exhaust gas-cooling device for reducing the temperature of exhaust gases emitted from a vehicle's engine.

Exhaust gas conveyance systems on vehicles frequently emit exhaust gases with extremely high temperatures. The high temperatures can be achieved from routine engine operation, particularly on larger vehicles. Further, the high temperatures can also be achieved during a regeneration event, where collected particulate matter that is trapped in a particulate filter is oxidized. During both routine operation and regeneration events, the vehicle's operating environment can be subjected to undesirable high temperatures.

The conventional method of cooling exhaust gases is an "in-can" or "in-muffler" venturi device. In the path of exhaust gas flow, the venturi device is located downstream of the muffler and upstream of the tailpipe, and uses ambient air to lower the overall temperature of the gases emitted from the tailpipe. In the venturi device, a "cold pipe" draws in ambient air, and sits within a "hot pipe" that forms the path of flow of the exhaust gases. The exhaust gases travel within the hot pipe and around the cold pipe. As the exhaust gases travel around the cold pipe, the exhaust gases are cooled. At an outlet of the cold pipe, the ambient gases and the exhaust gases are mixed in the tailpipe for further cooling. However, new emissions laws require that the exhaust gas temperatures be lowered beyond the capabilities of the conventional in-muffler venturi device.

Thus, there is a need for an improved exhaust gas-cooling device that can adequately reduce the temperature of the exhaust gas to meet increasingly stringent emissions requirements.

There is also a need for an improved exhaust gas-cooling device that can be easily provided on most exhaust gas conveyance systems with little modification to the existing exhaust gas conveyance system.

BRIEF SUMMARY OF THE INVENTION

The above-listed needs are met or exceeded by the present exhaust gas-cooling device for use on an exhaust gas conveyance system of a vehicle having an exhaust gas passageway to emit exhaust gases from an engine to an outlet. The exhaust gas cooling device includes an exhaust passageway pipe in fluid communication with the engine, and a micro-venturi mixing chamber pipe in fluid communication with and located downstream of the exhaust passageway pipe. The micro-venturi mixing chamber pipe defines the outlet of the exhaust gas-cooling device and has at least one aperture disposed on a pipe wall of the micro-venturi mixing chamber for introducing ambient air into the micro-venturi mixing chamber pipe.

An alternate embodiment of an exhaust gas-cooling device includes an exhaust passageway pipe in fluid communication with the engine, a constriction portion in fluid communication with the exhaust passageway pipe and an exhaust inlet at a bottom end. The device also includes a micro-venturi mixing chamber pipe having a first end in fluid communication with and located downstream of the exhaust passageway pipe, and a second end defining the outlet of the exhaust gas-cooling device. The micro-venturi mixing chamber pipe has at least one aperture disposed on a pipe wall. When the exhaust gas flows through the constriction portion, the pressure at the micro-venturi mixing chamber pipe is reduced as compared to at the pressure at the bottom end of said exhaust passageway pipe, and the ambient air is drawn into said micro-venturi mixing chamber pipe at the aperture.

Also provided is a micro-venturi mixing chamber pipe for use on an exhaust gas-cooling device of a vehicle having an exhaust gas passageway to emit exhaust gases from an engine to an outlet, the exhaust gas-cooling device having an exhaust passageway pipe in fluid communication with the engine. The micro-venturi mixing chamber pipe includes a generally cylindrical wall forming the exhaust gas passageway, an upper end of the wall defining the outlet of the exhaust gas passageway, and a lower end of the wall configured for attachment to the exhaust passageway pipe. The pipe also includes a plurality of apertures disposed on the cylindrical wall.

BRIEF DESCRIPTION OF THE DRAWINGS

FIG. 6A is a top view of the micro-venturi device of FIG. 5;

FIG. 6B is a right side view of the micro-venturi device of FIG. 5;

FIG. 6C is a front, plan view of the micro-venturi device of FIG. 5;

FIG. 6D is a perspective view of the micro-venturi device of FIG. 5;

FIG. 7 depicts the temperature distribution of the micro-venturi device of FIG. 5.

DETAILED DESCRIPTION OF THE INVENTION

Figure 1:
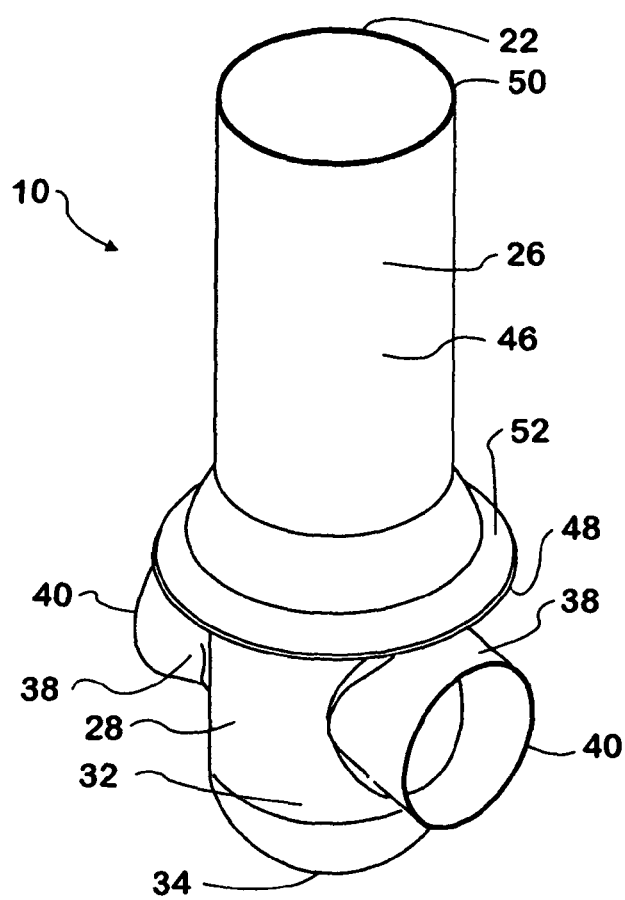
FIG. 1 is a perspective view of a prior art in-muffler venturi device.
Figure 3:
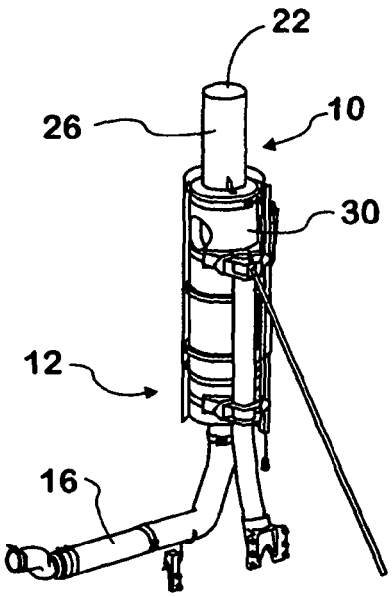
FIG. 3 is a perspective view of the vertical exhaust system of FIG. 2.
Figure 2:
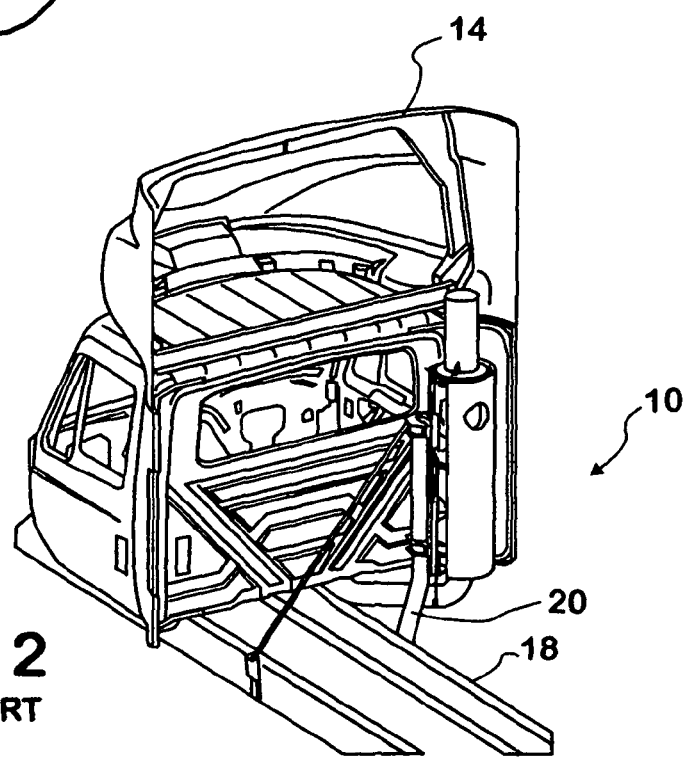
FIG. 2 is a partial perspective view of a vertical exhaust system of a vehicle having the prior art in-muffler venturi device of FIG. 1.

Referring now to FIGS. 1-3, a prior art exhaust gas-cooling device is depicted generally at 10, and is disposed on an exhaust gas conveyance system, depicted generally at 12. The exhaust gas conveyance system 12 is mounted on a vehicle 14 forming an exhaust gas passageway 16 which routes the exhaust gases from the vehicle's engine (not shown) to a remote location where the gases can be expelled into the ambient. The exhaust gas conveyance system 12 is mounted on a chassis member 18 using conventional mounting structures 20.

In the direction of flow of the exhaust gases, the exhaust gas conveyance system 12 incorporates aftertreatment devices (not shown), and specifically, includes an oxidation catalyst member (not shown) and a particulate filter (not shown). The oxidation catalyst member oxidizes unburned fuel and oil to reduce harmful emissions, and the particulate filter removes particulate matter from the exhaust gases. When particulate matter gets trapped in the particulate filter, a periodic or continuous regeneration event oxidizes the collected particulate matter. The regeneration event typically produces large amounts of heat, which increases the heat of the exhaust gases.

The exhaust gas-cooling device 10 is located downstream of the particulate filter and adjacent to and upstream from an exhaust gas passageway outlet 22. For purposes of this application, the terms "downstream" and "upstream" refer to the direction of gas flow from the engine out into the ambient. The exhaust gas-cooling device 10 is configured for introducing ambient air into the exhaust gas conveyance system 12 to mix with the exhaust gases. After mixing, the temperature of the resulting exhaust gas emitted from the exhaust gas outlet 22 is lowered with respect to the unmixed gases entering the exhaust gas-cooling device 10 at an exhaust gas inlet 24.

Figure 4A:
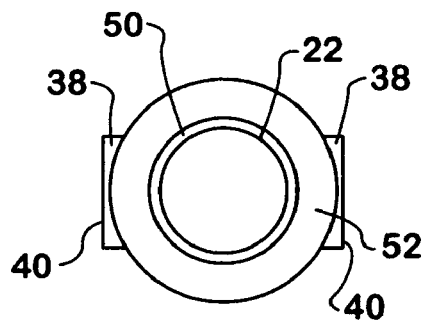
FIG. 4A is a top view of the prior art in-muffler venturi device.
Figure 4B:
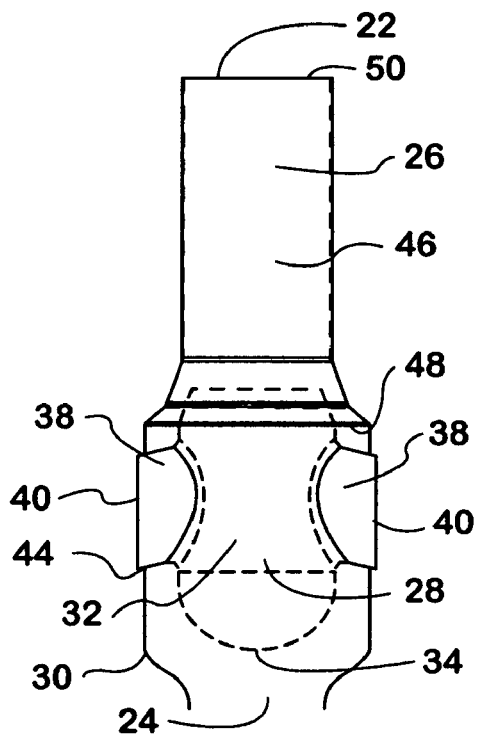
FIG. 4B is a front, plan view of the prior art in-muffler venturi device.
Figure 4C:
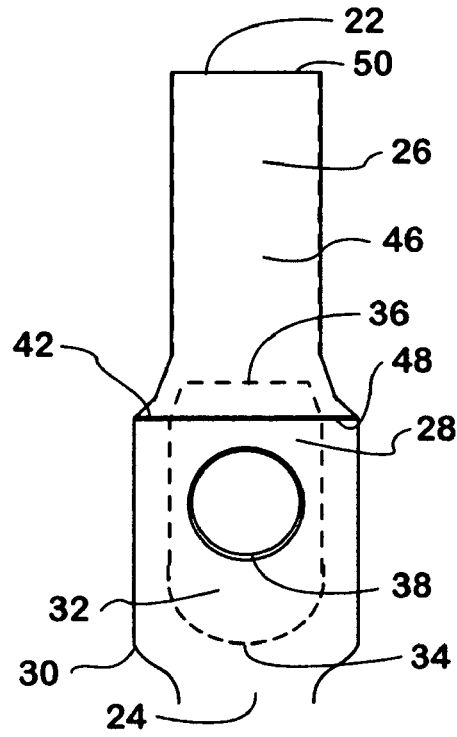
FIG. 4C is a side view of the prior art in-muffler venturi device.

As seen in FIGS. 4A-4C, the prior art exhaust gas-cooling device 10 includes a tailpipe 26 and a cold pipe 28 located upstream of the tailpipe. As seen in FIGS. 2 and 3, the cold pipe 28 sits within a hot pipe 30 that is in fluid communication with the muffler at the exhaust gas inlet 24.

The cold pipe 28 is generally "cup"-shaped, or more specifically, the cold pipe has a generally cylindrical body 32 with an enclosed, rounded end 34 and an open outlet end 36. Side pipes 38 extend generally radially outwardly from the cylindrical body 32, and as seen in FIGS. 2 and 3, the side pipes extend radially outwardly to the hot pipe 30 to be open to the ambient. In this configuration, the side pipes 38 define an ambient air inlet 40 and also define a passageway for the fluid communication of the ambient air into the body 32 of the cold pipe 28. The ambient air is drawn into the side pipes 38 into the cold pipe, and travels up out of the open outlet end and into the tailpipe.

Referring back to FIGS. 2 and 3, the cold pipe 28 sits within the generally cylindrical hot pipe 30. An upper end 42 of the hot pipe 30 is sealingly engaged with the tailpipe 26, and the exhaust gas inlet 24 is attached to the muffler. The hot pipe 30 also has side openings 44 corresponding to the locations of the two side pipes 38 on the cold pipe 28. The side pipes 38 extend through the side openings 44 in the hot pipe 30. In this configuration, the exhaust gases exiting from the engine travel through the exhaust gas inlet 24, around the cold pipe body 32, around the side pipes 38, and into the tailpipe 26.

The tailpipe 26 has a generally cylindrical body 46 having an inlet end 48 and an outlet end 50. The outlet end 50 of the tailpipe 26 corresponds to the outlet 22 of the exhaust gas passageway 16. The inlet end 48 includes an apron 52 that is attached to the hot pipe 30, and is configured to transitionally decrease the diameter of the inlet end 48 with respect to the hot pipe.

While this prior art cooling device 10 achieves a lowering of the resultant gas temperatures at the outlet 22 of the exhaust gas passageway 16, the cooling device may not adequately cool the exhaust gases to meet increasingly stringent future emissions requirements.

Figure 5:
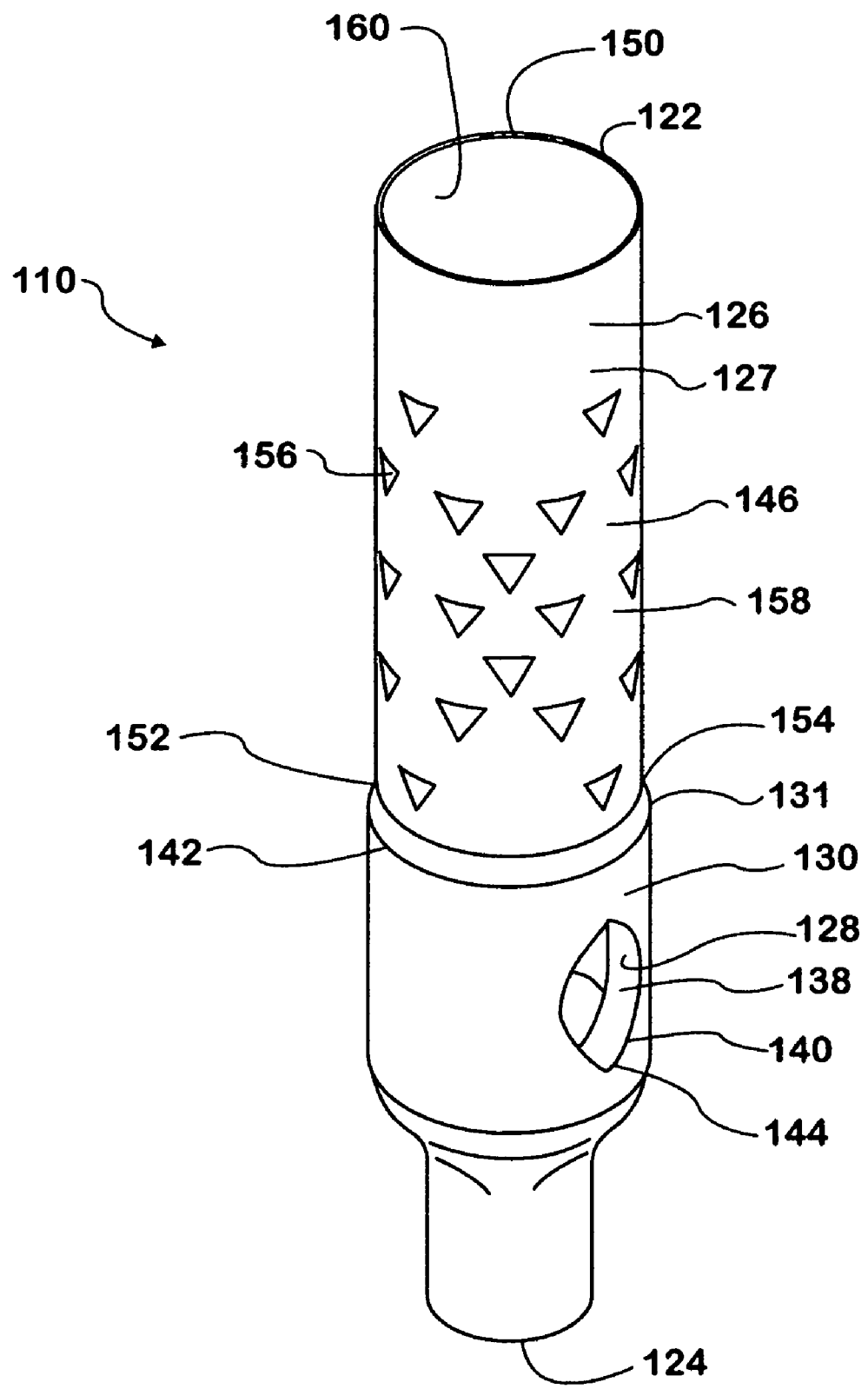
FIG. 5 is a micro-venturi device of the present invention.

Referring now to FIGS. 5-6D, an exhaust gas-cooling device of the present invention is depicted generally at 110, and is generally of the "in-can" venturi type. Similar to the exhaust gas-cooling device 10, the exhaust gas-cooling device 110 is configured to be disposed on an exhaust gas conveyance system 12 mounted on a vehicle 14 (FIGS. 2 and 3) forming an exhaust gas passageway 116 which routes the exhaust gases from the vehicle's engine (not shown) to a remote location where the gases can be expelled into the ambient. Also similar to the exhaust cooling device 10, the exhaust gas conveyance system 12 also incorporates after-treatment devices including an oxidation catalyst member (not shown) and a particulate filter (not shown). While the following description is directed to an exhaust gas-cooling device 110 and an exhaust gas conveyance system 12 for use with the particular vehicle depicted in FIG. 2, the exhaust gas-cooling device and the exhaust gas conveyance system can be used on other vehicles.

The exhaust gas-cooling device 110 is located downstream of the particulate filter and adjacent to and upstream from an exhaust gas passageway 122. The exhaust gas-cooling device 110 is configured for introducing ambient air into the exhaust gas conveyance system 12 to mix with the exhaust gases. After mixing, the temperature of the resulting gas emitted from the outlet 122 is lowered with respect to the unmixed gases entering the exhaust gas-cooling device 110.

In the exhaust gas-cooling device 110, an ambient air intake pipe or "cold pipe" 128 sits within an exhaust passageway pipe or "hot pipe" 130 that defines the exhaust gas passageway 16 between the muffler and the exhaust passageway gas outlet 122. Referring to FIG. 6B, the exhaust gas flow path "$F_E$" can be seen. In the preferred embodiment, substantially the entire ambient air intake pipe 128 is disposed within the exhaust passageway pipe 130, however it is contemplated that at least a portion of the ambient air intake pipe forms a surface that the exhaust gas is incident on. In the embodiment where the entire ambient air intake pipe 128 is disposed within the exhaust passageway pipe 130, the cross-sectional area of the ambient air intake pipe is generally smaller than the cross-sectional area of the exhaust passageway pipe to permit the flow of gas around the outside of the ambient air intake pipe and within the exhaust passageway pipe.

The ambient air intake pipe 128 is generally "cup"-shaped, or more specifically, the ambient air intake pipe has a generally cylindrical body 132 with an enclosed, rounded end 134 and an open outlet end 136. Side pipes 138 extend generally radially outwardly from the cylindrical body 132, the side pipes preferably extending to the exhaust passageway pipe 130 to be open to the ambient. In this configuration, the side pipes 138 define an ambient air inlet 140 and also define a passageway for the fluid communication of the ambient air into the body 132 of the ambient air intake pipe 128. As seen by flowpath "$F_{A1}$" in FIG. 6C, the ambient air is drawn into the side pipes 138 into the ambient air intake pipe 128, into the body 132 of the ambient air intake pipe, and travels up out of the open outlet end 136.

The engagement of the sides pipes 138 with the exhaust passageway pipe 130 preferably supports the ambient air intake pipe 128 within the exhaust passageway pipe. In the preferred embodiment, there are two side pipes 138 generally at 180-degrees from each other, but other configurations are contemplated. The cross-sectional shape of each side pipe 138 is preferably oval-like, although other configurations are contemplated.

The exhaust passageway pipe 130 preferably has two side openings 144 corresponding to the locations of the two side pipes 138 on the ambient air intake pipe 128. The side pipes 138 preferably extend through the side openings 144 in the exhaust passageway pipe 130. In this configuration, the exhaust gases exiting from the engine travel through an exhaust gas inlet 124, around the ambient air intake pipe body 132, and around the side pipes 138. A constriction portion 131 having a narrowed cross section is preferably in fluid communication with an upper end 142 of the exhaust passageway pipe.

The exhaust gas-cooling device 110 also includes a micro-venturi mixing chamber pipe 126 having a chamber wall 127, the mixing chamber being located downstream of the exhaust passageway pipe 130 and the ambient air intake pipe 128. The micro-venturi mixing chamber pipe 126 has a generally cylindrical body 146 having an inlet end 148 sealingly attached to the exhaust passageway pipe 130, and an outlet end 150. The outlet end 150 of the micro-venturi mixing chamber pipe 126 corresponds to the exhaust gas passageway outlet 22. The inlet end 148 preferably includes an apron 152 that is preferably integrally formed with or attached to the exhaust passageway pipe 130. In the preferred embodiment, the apron 152 forms the constriction portion 131, however the constriction portion may also be formed by the exhaust passageway pipe 130. The open outlet end 136 of the ambient air intake pipe 128 is preferably located at a lower end 154 of the micro-venturi mixing chamber pipe 126, however other configurations are contemplated. The cross-sectional area of the micro-venturi mixing chamber pipe 126 provides a greater flow area as compared to the area between the exhaust passageway pipe 130 and the ambient air intake pipe 128.

Figure 7:
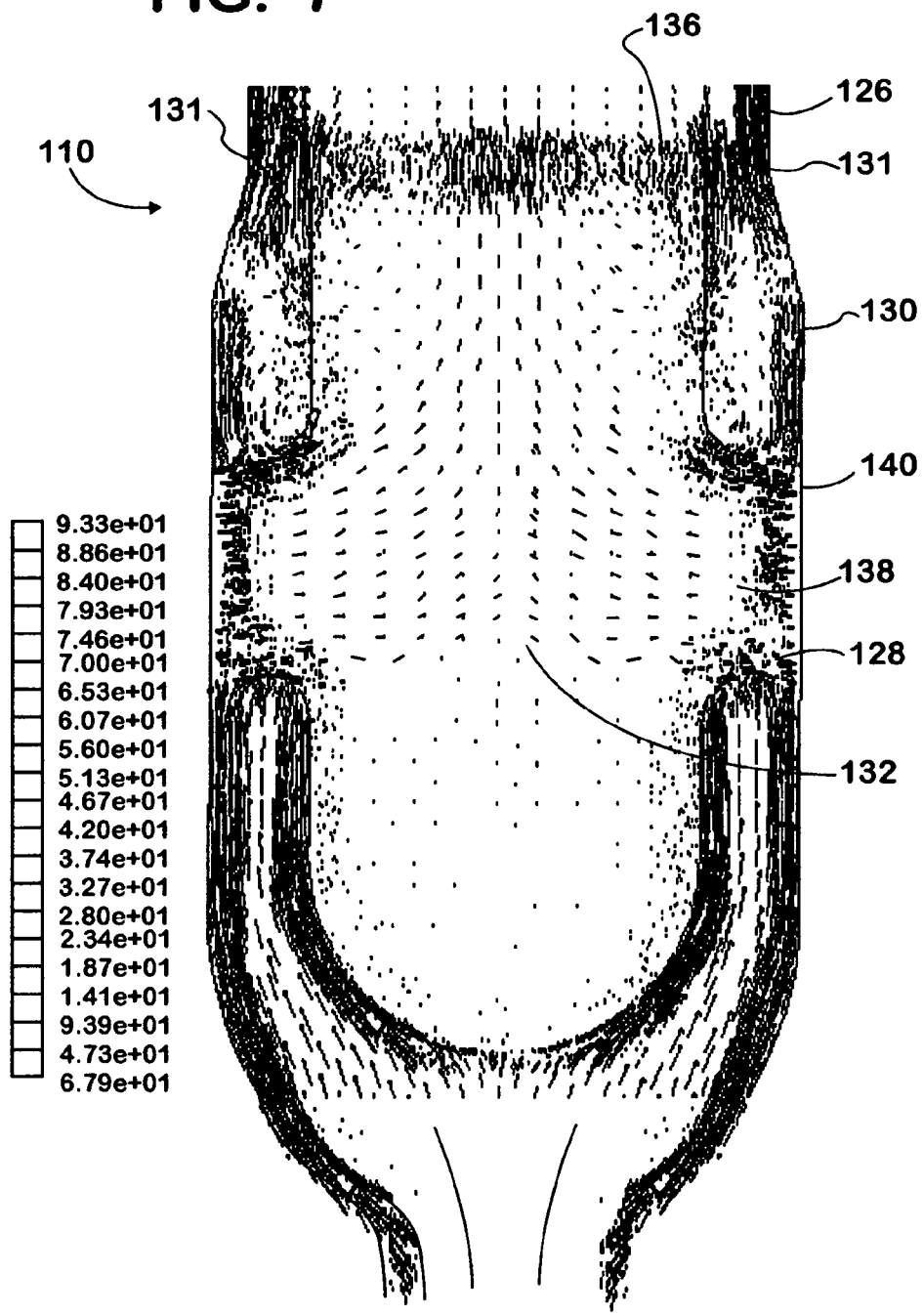
FIG. 7 depicts the velocity of the exhaust gas and the ambient gas in the micro-venturi device.

Referring to FIG. 7, the arrangement of the ambient air intake pipe 128 inside the exhaust passageway pipe 130 creates a restricted flow area, particularly at the constriction portion 131 of the exhaust passageway pipe. The restriction of the surface area between the exhaust passageway pipe 130 and the ambient air intake pipe 128 results in a venturi effect. Generally, the venturi effect occurs where a fluid (liquid or gas) flows through a pipe with a constriction (localized area of smaller cross-section). The fluid speeds up in the constricted area, which reduces the pressure, producing a partial vacuum. Then, when the fluid leaves the constricted area and enters the mixing chamber, the fluid is slowed by a pressure gradient force that raises the pressure.

In the present configuration, when the exhaust gases flow within the exhaust passageway pipe 130 and around the ambient air intake pipe 128, the exhaust gases speed up, reducing the pressure. For example, at the constriction portion 131 of the preferred exhaust gas-cooling device 110, the velocity of the exhaust air in the exhaust passageway pipe 130 is about 93 meters/second as compared to about 20 meters/second downstream of the constriction. When the gases travel into the micro-venturi mixing chamber pipe 126, the exhaust gases are still traveling at a relatively high velocity, and the pressure is still relatively low. Since there is an area of localized low pressure, and the ambient air intake pipe outlet 136 is located in this area of low pressure, a partial vacuum is created inside the ambient air intake pipe 128. With this vacuum, ambient air is drawn into the ambient air inlet 140, traveling from high to low pressure through the side pipes 138, into the body 132 of the ambient air intake pipe 128, and out of the open outlet end 136 to the micro-venturi mixing chamber pipe 126 where the ambient air mixes with the exhaust gases.

Referring back to FIGS. 5-8, the micro-venturi mixing chamber pipe 126 includes at least one, and preferably a plurality of micro-venturi apertures 156 extending from an outside surface 158 to an inside surface 160 of the chamber body 146. The micro-venturi apertures 156 are preferably generally spaced along the length and around the perimeter of the chamber body 146. In the preferred embodiment, each quarter of the micro-venturi mixing chamber pipe 126 is symmetrical. The micro-venturi apertures 156 are generally triangular in shape, although other shapes are contemplated, including squares, half-circles or any other shape. Further, it is contemplated that multiple different shaped apertures 156 may be used.

In the preferred embodiment, all of the micro-venturi apertures 156 have generally the same alignment. The micro-venturi apertures 156 are preferably staggered in alternating rows around the chamber body 146. In the staggered configuration, the speed of the ambient flow impinging on the micro-venturi aperture 156 is increased with respect to a configuration where the apertures are aligned. With the staggered apertures 156, the ambient air incident on the chamber body 146 has a greater distance to travel until it reaches an aperture. Over this distance, the ambient air which is incident on the chamber body 146 can recover its flow momentum and increase its speed before it reaches the aperture 156.

As the exhaust gas enters the micro-venturi mixing chamber pipe 126, the exhaust gas is mixed with ambient air that enters the chamber from the micro-venturi apertures 156 lining the chamber body 146. Due to the area of localized low pressure in the micro-venturi mixing chamber pipe 126, the partial vacuum draws ambient air through the micro-venturi apertures 156 and into the chamber, which cools the exhaust gas. The flowpath "$F_{A2}$" of the ambient air through the apertures 156 can be seen in FIG. 6D.

Further, it has been found that the particular shape and alignment of the micro-venturi apertures 156 introduces ambient air flow that causes further turbulence to the exhaust gas flow in the micro-venturi mixing chamber pipe 126. The disturbances in the exhaust gas airflow caused by the introduction of ambient air flow results in further mixing of the exhaust gas with the ambient air, which reduces the temperature of the exhaust gas. Further, an increase in speed of ambient airflow "$F_{A2}$" generally results in more turbulence.

Referring to FIG. 8, the temperature distribution of the exhaust gas-cooling device 110 is shown. At the exhaust passageway pipe 130, the temperature is about 900 Kelvin, and at the outlet 150 of the micro-venturi mixing chamber pipe 126, the temperature is about 500 Kelvin, with the temperature generally ranging between these two extremes along the length of the chamber body 146. Further, as can be seen in FIG. 8, immediately adjacent and above the micro-venturi apertures 156, where the ambient air is introduced to the exhaust gas, the temperature is about 400 Kelvin.

The exhaust gas-cooling device 110 is preferably configured to be mounted horizontally, however it is contemplated that the device can also be mounted vertically. Since the exhaust gas-cooling device 110 is preferably made of stainless steel or similar materials, additional chassis structure may be required to support the weight of the device.

The present exhaust gas-cooling device 110 further reduces the temperature of the exhaust gases as compared to conventional "in-can" venturi devices to be compliant with increasingly stringent emissions requirements. Further, the configuration of the micro-venturi mixing chamber pipe 126 makes it easy to retrofit existing exhaust gas-cooling devices by replacing the conventional tailpipe with the micro-venturi mixing chamber pipe.

While particular embodiments of the present exhaust gas-cooling device 110 have been shown and described, it will be appreciated by those skilled in the art that changes and modifications may be made thereto without departing from the invention in its broader aspects and as set forth in the following claims.

We claim:

1. An exhaust gas-cooling device for use on an exhaust gas conveyance system of a vehicle having an exhaust gas passageway to emit exhaust gases from an engine to an outlet, the exhaust gas passageway being in fluid communication with air from the ambient, comprising:

an exhaust passageway pipe in fluid communication with the engine;

a micro-venturi mixing chamber pipe having a first end in fluid communication with and located downstream of the exhaust passageway pipe, and a second end defining the outlet of the exhaust gas-cooling device, the exhaust passageway pipe and the micro-venturi mixing chamber pipe being joined to form a closed channel at the junction;

at least one aperture disposed on the micro-venturi mixing chamber pipe;

an ambient air intake pipe that is at least partially disposed within the exhaust passageway pipe, the ambient air intake pipe being disposed upstream of the micro-venturi mixing chamber pipe, the ambient air intake pipe has at least one side opening in the exhaust passageway pipe that is directly open to the ambient and is unenclosed; and a constriction portion disposed at the junction of the exhaust passageway pipe and the micro-venturi mixing chamber pipe, wherein when the exhaust gas flows through the constriction portion, the pressure at the micro-venturi mixing chamber pipe is reduced from the pressure upstream of the constriction portion, and the ambient air is drawn into the micro-venturi mixing chamber pipe from the at least one aperture.

2. The exhaust gas cooling device of claim 1 wherein the at least one aperture defines a plurality of apertures disposed on the pipe body.

3. The exhaust gas cooling device of claim 2 wherein the plurality of apertures are triangular, square or half-circle in shape.

4. The exhaust gas cooling device of claim 2 wherein the plurality of apertures are disposed along the length and around the periphery of the pipe body.

5. The exhaust gas-cooling device of claim 1 wherein the ambient air intake pipe has a body portion and the least one side pipe extending from the body to the opening to the ambient in the exhaust passageway pipe.

6. The exhaust gas-cooling device of claim 5 wherein the at least one side pipe defines an ambient air inlet in fluid communication with the body, which is in fluid communication with the micro-venturi mixing chamber pipe, wherein the reduced pressure at the micro-venturi mixing chamber pipe draws ambient air through the ambient air intake pipe to the micro-venturi mixing chamber pipe.

* * * * *